Patented Aug. 16, 1938

2,127,371

UNITED STATES PATENT OFFICE 2,127,371

AROMATIC COMPOUNDS OF TRIVALENT ANTIMONY AND PROCESS OF PREPARING THE SAME

Hans Schmidt, Wuppertal-Vohwinkel, Germany, assignor to Winthrop Chemical Company, Inc., New York, N. Y., a corporation of New York No Drawing. Application May 15, 1933, Serial No. 671,286. In Germany May 19, 1932

31 Claims. (Cl. 260—307)

This invention relates to neutral, water-soluble complex compounds of trivalent antimony of the aromatic series and to a process of preparing the same; more particularly it relates to complex compounds of arylstibine oxides with benzene derivatives containing at least two hydroxyl groups in ortho-position to each other and at least one acid group capable of forming salts, and to a process of preparing such complex compounds.

The primary organic compounds of the trivalent antimony of the general formula $$R\text{---}SbO.n H_2O$$

wherein R stands for an aromatic radical, are known as relatively unstable compounds. They tend to transform into compounds of the general formula $$(R_2Sb)_2O$$

while splitting off antimony. Such a transformation process is favored by the presence of tartaric, lactic and malic acids which are known as complex forming compounds of the aliphatic series (compare Annalen der Chemie 421 (1920), page 215, and 429 (1922), page 131).

In accordance with the present invention neutral, water-soluble complex compounds of mon-arylstibine oxides are obtainable without splitting off antimony from the arylstibine oxide by reacting upon the mono-arylstibine oxide with a benzene derivative containing at least two hydroxy groups in ortho-position to each other and at least one acid group capable of forming salts, such as the carboxylic, sulfonic and arsenic acid group, while rendering the reaction mixture neutral by the addition of a base.

In the above indicated reaction the arylstibine compounds may be used in the form of stibine oxides or in the form of freshly precipitated oxides, i. e., in the hydrated form, as prepared for instance by treating the corresponding halides with caustic alkalis. The said arylstibine oxides may be substituted in the benzene nucleus by halogen atoms, preferably chlorine and bromine, alkyl groups, such as the methyl, ethyl, propyl, isopropyl groups, or O—R—COOH groups, further by amino and substituted amino groups, such as alkyl-, hydroxyalkyl- and acyl-amino groups for instance, the methyl-amino, ethyl-amino, acetyl-amino and carbethoxyamino groups. The said substituted amino groups may also be combined with another substituent of the benzene nucleus to a ring, as, for instance, in the benzoxazolonestibineoxide and the benzimidazolone-stibine oxides of the following formulae:

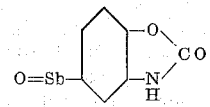

and

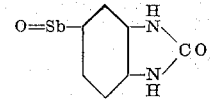

Pyrocatechin and pyrogallol carboxylic and sulfonic acids are preferably used as the acid derivative containing at least 2 hydroxy groups in ortho-position to each other, but it may be mentioned that also acid derivatives of other polyhydroxy benzenes containing at least 2 hydroxyl groups in ortho-position to each other, and also compounds containing other acid groups, for instance, the arsenic acid radical, may be employed.

A finally neutral reaction is effected by the addition of an alkali metal-, magnesium or calcium hydroxide, ammonia or an aliphatic amine, such as dimethyl- and diethyl-amines, piperidine and ethanol-amine; the use of sodium and calcium hydroxides, diethylamine and diethylaminoethanol has proved particularly advantageous.

The reaction is performed in the presence of a solvent; advantageously aqueous alcohols, such as methyl and ethyl alcohol are used. The reaction temperature may be normal temperature, sometimes cooling is advisable. From the reaction mixture the complex compound formed is advantageously separated by pouring the reaction mixture into excess alcohol while stirring.

In the above reaction two, three or four molecules of the acid hydroxy benzene derivative may be caused to react upon 1 molecule of the arylstibine oxide. It is not necessary to use the reacting components in stoichiometric proportions, since also neutral complex compounds which are suitable for practical use are obtainable if the reacting components are combined in other proportions. In this connection it may be emphasized that the present invention does not relate to the manufacture of complex compounds which are characterized by definite structural or empirical formulae which would be of mere scientific interest, but the invention tends to transform the arylstibine compounds which hitherto could not be employed in therapy into neutral, water-soluble complex compounds which can be used therapeutically without causing any harm. The usefulness of such complex compounds in therapy has proved to be independent to a marked extent on the proportions of the arylstibine radical and the complex-forming acid hydroxy benzene component.

In the above described manner whitish to weakly colored complex compounds of the trivalent antimony are obtained which are insoluble in alcohol, but dissolve in water to neutral solutions. In the said complex compounds the antimony is. partly linked to a carbon atom of a benzene nucleus contained in the arylstibine compound used as starting material. Other valences of the antimony are linked to the hydroxyl oxygen atoms of the benzene derivative containing at least 2 hydroxyl groups standing in ortho-position to each other and at least one acid group capable of forming salts, which benzene derivative has been used as complex-forming component in the above described reaction. The new complex compounds are neutral by a content of a basic component as above specified.

As to the composition of the new complex compounds it has been stated above that it is not necessary that the complex compounds contain the arylstibine component and the acid polyhydroxy benzene component in a definite proportion. Obviously, the structure of the new complex compounds is often of a complicated nature and, therefore, I am not able to give the structural formulae of the new complex compounds in all cases.

The analysis of the new compounds shows that the neutral, water-soluble products obtainable in accordance with the above described process may have various compositions, this depending on the quantities of the reacting components used in the reaction; for instance, complex compounds containing upon 1 arylstibine radical 2 or 3 radicals of the acid polyhydroxy benzene component have been obtained.

The new antimony complex compounds are intended to be used in therapy, particularly in the treatment of infectious diseases. The neutral aqueous solutions may be used for injection.

The invention is further illustrated by the following examples, but it is not limited thereto:

*Example 1.*—A solution, suspension respectively of 6.5 grams of para-acetylaminophenylstibinechloride dissolved in methyl alcohol is poured into an ice cooled solution of 14 grams of the bibasic sodium salt of pyrocatechindisulfonic acid while stirring. A solution of 2 normal diethylaminoethanol is simultaneously added until the reaction is neutral or about neutral. The solution is filtered and the complex salt formed is precipitated by pouring into alcohol while stirring. After separating and drying in the exsiccator, an almost colorless powder which is readily soluble in water with neutral reaction is obtained. On adding hydrogen sulfide the acidified solution yields the light yellow precipitate which is characteristic of the organic antimony compounds. According to analysis in the new product one molecule of para-acetylaminophenylstibineoxide is combined with two molecules of sodium pyrocatechinsulfonate and the R—SbO type is maintained in the reaction.

The compound obtained corresponds to the following formula:

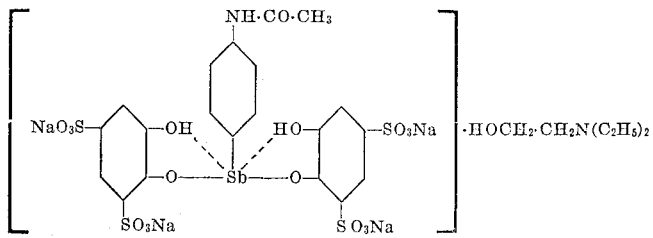

On using milk of lime for effecting the neutralization, likewise a neutrally soluble complex salt which contains calcium is obtained. Similarly magnesium hydroxide, ammonia and ethanolamine may be used as the neutralizing agent.

In an analogous manner neutral complex salts are obtained when using, for instance, meta-chloro - para - acetylaminophenylstibinechloride-hydrochloride, or meta-para-benzimidazolestibinechloride-hydrochloride. On the other hand, also the sodium salt of pyrocathechin sulfonic acid, the sodium salt of pyrogalloldisulfonic acid, or the corresponding potassium salts, furthermore, gallic acid, pyrocatechincarboxylic acid and pyrocatechinarsonic acid may be used.

*Example 2.*—6 grams of meta-amino-para-carbamidophenylstibinechloride-hydrochloride in methylalcoholic suspension are introduced into a solution of 10 grams of the bibasic sodium salt of pyrocatechindisulfonic acid while simultaneously adding a solution of dilute caustic soda until the reaction is neutral. The solution is filtered, diluted with methyl alcohol and the complex salt formed is precipitated by pouring into ethyl alcohol while stirring. After separating the precipitate and drying in the exsiccator the sodium salt of meta-amino-para-carbamidophenylstibineoxide-pyrocatechindisulfonic acid is obtained as a whitish powder which is readily soluble in water with neutral reaction. The aqueous solution yields no precipitate on the addition of dilute hydrochloric acid. The hydrochlorid acid solution yields a light yellow precipitate on the addition of hydrogen sulfide. The said product contains 1 molecule of the stibine component combined with about 2 molecules of pyrocatechindisulfonic acid.

On using 15 grams of the bibasic sodium salt of pyrocatechindisulfonic acid, a complex salt of analogous properties is obtained. It contains 1 molecule of the stibine component combined with about 3 molecules of the pyrocatechin derivative.

*Example 3.*—4 grams of 4-hydroxyacetic acid-3-aminophenylstibinechloride-hydrochloride, obtainable by reduction of 4-hydroxyacetic acid-3-nitrophenylstibinic acid, are mixed up and added to a solution of 14 grams of the bibasic sodium salt of pyrogalloldisulfonic acid in water. Thereupon a solution of dilute diethylamine is added until the reaction is neutral. The solution is filtered and the complex salt formed is precipitated by pouring the solution into alcohol while stirring. After separating the precipitate and drying a faintly colored powder is obtained which readily dissolves in water with neutral reaction and light yellow color. The solution acidified with dilute hydrochloric acid yields a light yellow turbidity on the addition of hydrogen sulfide.

In an analogous manner a complex compound is obtainable when starting with benzimidazolonestibine oxide of the probable formula:

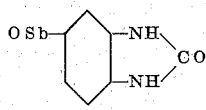

which latter is obtainable by reduction of benzimidazolonestibinic acid.

Example 4.—Benzoxazolonestibineoxide, prepared fom 6 grams of benzoxazolonestibonic acid of the probable formula:

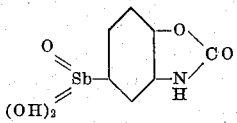

by reduction with sulfurous acid is mixed up as freshly precipitated paste with a solution of 14 grams of the bibasic sodium salt of pyrocatechindisulfonic acid while adding a small quantity of methyl alcohol and a solution of dilute caustic soda until the reaction is almost neutral. The solution thus obtained is filtered and the filtrate is poured into alcohol while stirring. After separating the precipitate and drying in vacuo a faintly colored powder which is readily soluble in water with neutral reaction is obtained. The solution acidified with dilute hydrochloric acid yields a light yellow turbidity on the addition of hydrogen sulfide.

In an analogous manner a complex salt of, for instance, the para-ethylamino- or para-ethyl-acetylaminophenyl or of hydroxyalkylaminophenyl-stibineoxides may be obtained.

Example 5.—3.2 grams of para-acetylaminophenyl-stibinechloride are dissolved in methyl alcohol. The solution is added to a solution of 8 grams of calcium-sodium calcium-pyrocatechindisulfonate (compare U. S. Patent No. 1,879,533) of the formula:

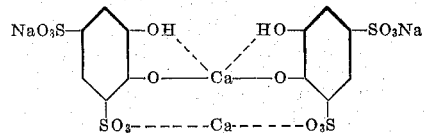

2-normal milk of lime is added until the reaction is neutral, the solution is filtered and precipitated by pouring into alcohol while stirring. After separating the precipitate and drying in vacuo, the complex salt formed is obtained as a faintly colored powder, which is readily soluble in water with neutral reaction.

Example 6.—A solution of 3.2 grams of para-acetylaminophenylstibinechloride in methyl alcohol is added to an aqueous solution of 8 grams of the sodium salt of pyrogalloldisulfonic acid. Neutralization is effected by means of dilute caustic soda, the solution is filtered and precipitated by pouring into alcohol while stirring. After separating the precipitate and drying in vacuo a faintly colored powder, which is readily soluble in water with neutral reaction, is obtained.

Example 7.—Chlorobenzoxazolonestibinechloride obtained by reduction of chlorobenzoxazolonestibonic acid of the probable formula:

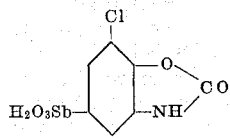

in hydrochloric acid solution, is dissolved in a small quantity of methyl alcohol and introduced into an ice cooled solution of 12 grams of the bibasic sodium salt of pyrogallol disulfonic acid in 60 ccs. of water. The solution is neutralized with a dilute solution of diethylaminoethanol, filtered and the complex salt formed is precipitated by pouring the solution into alcohol while stirring. After separating the precipitate and drying a faintly colored powder which is readily soluble in water is obtained. The acidified solution yields a yellow precipitate on the addition of hydrogen sulfide.

In an analogous manner, for instance, a soluble complex salt of the 4-acetylamino-2-methyl or 2-ethyl-phenyl-stibine oxide may be obtained.

I claim:—

1. The process which comprises reacting upon pyrocatechindisulfonic acid compound with an amino phenylstibine-chloride in the presence of water, a water-soluble alcohol and such a quantity of a base selected from the group consisting of sodium and calcium hydroxides, ammonia, diethylamine and diethylaminoethanol, that the final reaction is neutral.

2. The process which comprises reacting upon sodium pyrocatechindisulfonate with para-acetylamino phenylstibinechloride in the presence of water and methyl alcohol while neutralizing the reaction mixture with diethylaminoethanol.

3. Neutral, water-soluble complex compounds of trivalent antimony in which the antimony is partly linked to the benzene nucleus of a benzene derivative and partly to hydroxyl oxygen atoms of an ortho-polyhydroxybenzene containing at least one acid group capable of forming salts, in which antimony complex compounds the acid groups are neutralized by a basic radical selected from the group consisting of alkali metal, calcium, magnesium, ammonium and aliphatic amines, and which complex compounds are whitish to faintly colored substances which are insoluble in alcohol, but dissolve in water to neutral solutions and are suitable for therapeutic purposes.

4. Neutral, water-soluble complex compounds of trivalent antimony in which the antimony is partly linked to the benzene nucleus of a benzene derivative and partly to hydroxyl oxygen atoms of ortho-polyhydroxybenzene containing at least one acid group selected from the group consisting of carboxylic and sulfonic acid groups, in which antimony complex compounds the acid groups are neutralized by a basic radical selected from the group consisting of alkali metal, calcium, magnesium, ammonium and aliphatic amines, and which complex compounds are whitish to faintly colored substances which are insoluble in alcohol, but dissolve in water to neutral solutions and are suitable for therapeutic purposes.

5. Neutral, water-soluble complex compounds of trivalent antimony in which the antimony is partly linked to a benzene nucleus substituted by a member of the group consisting of an amino group, a substituted amino group and a substituted amino group which is a member of a heterocyclic nucleus combined with the benzene nucleus, and partly to the hydroxyl oxygen atoms of pyrocatechindisulfonic acid, in which antimony complex compounds the acid groups are neutralized by a basic radical selected from the group consisting of alkali metal, calcium, magnesium, ammonium and aliphatic amines, and which complex compounds are whitish to faintly colored substances which are insoluble in alcohol, but dissolve in water to neutral solutions and are suitable for therapeutic purposes.

6. Neutral, water-soluble complex compounds of trivalent antimony in which the antimony is partly linked to the benzene nucleus of an aminophenyl radical and partly to the hydroxyl oxygen atoms of pyrocatechindisulfonic acid, in which antimony complex compounds the acid groups are neutralized by a basic radical selected from the group consisting of sodium, calcium, ammonium, diethylamine and diethylaminoethanol, and which complex compounds are whitish to faintly colored substances which are insoluble in alcohol, but dissolve in water to neutral solutions and are suitable for therapeutic purposes.

7. The neutral, water-soluble complex compound of trivalent antimony in which the antimony is partly linked to the benzene nucleus of the para-acetylaminophenyl radical and partly to the hydroxyl oxygen atoms of pyrocatechindisulfonic acid, which antimony complex compound is neutral by the content of sodium and diethylaminoethanol and which complex compound contains one antimony atom combined with about two molecules of pyrocatechindisulfonic acid and about one molecule of acetylaminobenzene radical and forms a whitish powder which is insoluble in alcohol but dissolves in water to a neutral solution and is suitable for therapeutic purposes.

8. Neutral, water-soluble complex compounds of trivalent antimony in which the antimony is partly linked to the benzene nucleus of an aminocarbamido-phenyl radical and partly to the hydroxyl oxygen atoms of pyrocatechindisulfonic acid, which antimony complex compounds are neutral on account of containing a component selected from the group consisting of sodium, calcium, ammonium, diethylamine, and diethylaminoethanol, and which complex compounds are whitish to faintly colored substances which are insoluble in alcohol, but dissolve in water to neutral solutions and are suitable for therapeutic purposes.

9. Neutral, water-soluble complex compounds of trivalent antimony in which the antimony is partly linked to the benzene nucleus of an aminocarbamido-phenyl radical and partly to the hydroxyl oxygen atoms of pyrocatechindisulfonic acid, which antimony complex compounds are neutral on account of sodium, and which complex compounds are whitish to faintly colored substances which are insoluble in alcohol, but dissolve in water to neutral solutions and are suitable for therapeutic purposes.

10. Neutral, water-soluble complex compounds of trivalent antimony in which the antimony is partly linked to the benzene nucleus of an aminophenyl radical and partly to the hydroxyl oxygen atoms of pyrogallol disulfonic acid, in which antimony complex compounds the acid groups are neutralized by a basic radical selected from the group consisting of sodium, calcium, ammonium, diethylamine and diethylaminoethanol, and which complex compounds are whitish to faintly colored substances which are insoluble in alcohol, but dissolve in water to neutral solutions and are suitable for therapeutic purposes.

11. The neutral, water-soluble complex compound of trivalent antimony in which the antimony is partly linked to the benzene nucleus of the paraacetylaminophenyl radical and partly to the hydroxyl oxygen atoms of pyrogallol disulfonic acid, which antimony complex compound is neutral by the content of sodium and diethylaminoethanol and which complex compound contains one antimony atom combined with about two molecules of pyrogallol disulfonic acid and about one molecule of acetylamino benzene and forms a faintly colored powder which is insoluble in alcohol but dissolves in water to a neutral solution and is suitable for therapeutic purposes.

12. The process which comprises reacting upon an ortho-polyhydroxybenzene containing at least one acid group capable of forming salts, with an arylstibine compound selected from the group consisting of the oxide and the hydrated oxide, in the presence of a solvent and such a quantity of a base selected from the group consisting of alkali metal bases, calcium bases and magnesium bases, ammonia and aliphatic amines, that the final reaction is neutral.

13. Neutral, water-soluble complex compounds of trivalent antimony in which the antimony is partly linked to a benzene nucleus substituted by a member of the group consisting of an amino group, a substituted amino group and a substituted amino group which is a member of a heterocyclic nucleus combined with the benzene nucleus, and which is further substituted by a substituent selected from the group consisting of halogen, alkyl, alkoxy and carbethoxy groups and partly to the hydroxyl oxygen atoms of pyrocatechindisulfonic acid in which antimony complex compounds the acid groups are neutralized by a basic radical selected from the group consisting of sodium, calcium, ammonium, diethylamine and diethylaminoethanol and which complex compounds are whitish to faintly colored substances which are insoluble in alcohol but dissolve in water to neutral solutions and are suitable for therapeutic purposes.

14. Neutral, water-soluble complex compounds of trivalent antimony in which the antimony is partly linked to a benzene nucleus substituted by a member of the group consisting of an amino group, a substituted amino group and a substituted amino group which is a member of a heterocyclic nucleus combined with the benzene nucleus and which is further substituted by a substituent selected from the group consisting of halogen, alkyl, alkoxy and carbethoxy groups and partly to the hydroxyl oxygen atoms of pyrogallol disulfonic acid in which antimony complex compounds the acid groups are neutralized by a basic radical selected from the group consisting of sodium, calcium, ammonium, diethylamine and diethylaminoethanol and which complex compounds are whitish to faintly colored substances which are insoluble in alcohol, but dissolve in water to neutral solutions and are suitable for therapeutic purposes.

15. Neutral, watersoluble complex compounds of trivalent antimony in which the antimony is partly linked to a benzene nucleus which is substituted by a substituent selected from the group consisting of amino, alkylamino, hydroxyalkylamino, acylamino, carbethoxyamino, O—R—COOH (R being an aliphatic radical), carbamido and a substituted amino group which is a member of a heterocyclic nucleus combined with the benzene nucleus, and partly to hydroxyl oxygen atoms of an o-polyhydroxybenzene containing at least one acid group capable of forming salts in which antimony complex compounds the acid groups are neutralized by a basic radical selected from the group consisting of alkali metal, calcium, magnesium, ammonium and aliphatic amines and which complex compounds are whitish to faintly colored substances which are insoluble in alcohol, but dissolve in water to neutral solutions and are suitable for therapeutic purposes.

16. Neutral, watersoluble complex compounds of trivalent antimony in which the antimony is partly linked to a benzene nucleus which is substituted by a substituent selected from the group consisting of amino, alkylamino, hydroxyalkylamino, acylamino, carbethoxyamino, O—R—COOH (R being an aliphatic radical), carbamido and a substituted amino group which is a member of a heterocyclic nucleus combined with the benzene nucleus and which is further substituted by a substituent selected from the group consisting of halogen and alkyl groups and partly to hydroxyl oxygen atoms of an o-polyhydroxybenzene containing at least one acid group capable of forming salts in which antimony complex compounds the acid groups are neutralized by a basic radical selected from the group consisting of alkali metal, calcium, magnesium, ammonium and aliphatic amines and which complex compounds are whitish to faintly colored substances which are insoluble in alcohol, but dissolve in water to neutral solutions and are suitable for therapeutic purposes.

17. Neutral, watersoluble complex compounds of trivalent antimony in which the antimony is partly linked to a benzene nucleus which is substituted by a substituent selected from the group consisting of amino, alkylamino, hydroxyalkylamino, acylamino, carbethoxyamino, O—R—COOH (R being an aliphatic radical), carbamido and a substituted amino group which is a member of a heterocyclic nucleus combined with the benzene nucleus, and partly to hydroxyl oxygen atoms of an o-polyhydroxybenzene containing at least one acid group selected from the group consisting of pyrocatechindisulfonic acid and pyrogallol disulfonic acid in which antimony complex compounds the acid groups are neutralized by a basic radical selected from the group consisting of alkali metal, calcium, magnesium, ammonium and aliphatic amines and which complex compounds are whitish to faintly colored substances which are insoluble in alcohol, but dissolve in water to neutral solutions and are suitable for therapeutic purposes.

18. Neutral, watersoluble complex compounds of trivalent antimony in which the antimony is partly linked to a benzene nucleus which is substituted by a substituent selected from the group consisting of amino, alkylamino, hydroxyalkylamino, acylamino, carbethoxyamino, O—R—COOH (R being an aliphatic radical), carbamido and a substituted amino group, which is a member of a heterocyclic nucleus combined with the benzene nucleus, and which is further substituted by a substituent selected from the group consisting of halogen and alkyl groups, and partly to hydroxyl oxygen atoms of an o-polyhydroxybenzene containing at least one acid group capable of forming salts, in which antimony complex compounds the acid group consisting of alkali metal, calcium, magnesium, ammonium and aliphatic amines and which complex compounds are whitish to faintly colored substances which are insoluble in alcohol, but dissolve in water to neutral solutions and are suitable for therapeutic purposes.

19. Neutral, watersoluble complex compounds of trivalent antimony in which the antimony is partly linked to a benzene nucleus which is substituted by a substituent selected from the group consisting of amino, alkylamino, hydroxyalkylamino, acylamino, carbethoxyamino, O—R—COOH (R being an aliphatic radical), carbamido and a substituted amino group which is a member of a heterocyclic nucleus combined with the benzene nucleus, and partly to hydroxyl oxygen atoms of pyrocatechindisulfonic acid in which antimony complex compounds the acid groups are neutralized by a basic radical selected from the group consisting of alkali metal, calcium, magnesium, ammonium and aliphatic amines and which complex compounds are whitish to faintly colored substances which are insoluble in alcohol, but dissolve in water to neutral solutions and are suitable for therapeutic purposes.

20. Neutral, watersoluble complex compounds of trivalent antimony in which the antimony is partly linked to a benzene nucleus which is substituted by a substituent selected from the group consisting of amino, alkylamino, hydroxyalkylamino, acylamino, carbethoxyamino, O—R—COOH (R being an aliphatic radical), carbamido and a substituted amino group which is a member of a heterocyclic nucleus combined with the benzene nucleus, and which is further substituted by a substituent selected from the group consisting of halogen and alkyl groups and partly to hydroxyl oxygen atoms of pyrocatechindisulfonic acid in which antimony complex compounds the acid groups are neutralized by a basic radical selected from the group consisting of alkali metal, calcium, magnesium, ammonium and aliphatic amines and which complex compounds are whitish to faintly colored substances which are insoluble in alcohol, but dissolve in water to neutral solutions and are suitable for therapeutic purposes.

21. The process which comprises reacting upon an o-polyhydroxybenzene selected from the group consisting of pyrogallol disulfonic acid and pyrocatechindisulfonic acid with an arylstibine compound selected from the group consisting of the oxide and the hydrated oxide in the presence of a solvent and such a quantity of a base selected from the group consisting of alkali metal bases, calcium bases and magnesium bases, ammonia and aliphatic amines that the final reaction is neutral.

22. The process which comprises reacting upon an o-polyhydroxybenzene selected from the group consisting of pyrogallol disulfonic acid and pyrocatechindisulfonic acid with a phenylstibine compound selected from the group consisting of the oxide and the hydrated oxide the benzene nucleus of which is substituted by a substituent selected from the group consisting of the amino, alkylamino, hydroxyalkylamino, acylamino, carbethoxyamino, O—R—COOH (R being an aliphatic radical), carbamido and a substituted amino group which is a member of a heterocyclic nucleus combined with the benzene nucleus, in the presence of a solvent and such a quantity of a base selected from the group consisting of alkali metal bases, calcium bases and magnesium bases, ammonia and aliphatic amines that the final reaction is neutral.

23. The process which comprises reacting upon an o-polyhydroxybenzene selected from the group consisting of pyrogallol disulfonic acid and pyrocatechindisulfonic acid with a phenylstibine compound selected from the group consisting of the oxide and the hydrated oxide the benzene nucleus of which is substituted by a substituent selected from the group consisting of the amino, alkylamino, hydroxyalkylamino, acylamino, carbethoxyamino, O—R—COOH (R being an aliphatic radical), carbamido and a substituted amino group which is a member of a heterocyclic nucleus combined with the benzene nucleus, and which benzene nucleus is further substituted by a substituent selected from the group consisting of halogen and alkyl groups, in the presence of a solvent and such a quantity of a base selected from the group consisting of alkali metal bases, calcium bases and magnesium bases, ammonia and aliphatic amines that the final reaction is neutral.

24. The process which comprises reacting upon an o-polyhydroxybenzene containing at least one acid group capable of forming salts with a phenylstibine chloride the benzene nucleus of which is substituted by a substituent selected from the group consisting of the amino, alkylamino, hydroxyalkylamino, acylamino, carbethoxyamino, O—R—COOH (R being an aliphatic radical), carbamido, and a substituted amino group which is a member of a heterocyclic nucleus combined with the benzene nucleus, in the presence of a solvent and such a quantity of a base selected from the group consisting of alkali metal bases, calcium bases and magnesium bases, ammonia and aliphatic amines that the final reaction is neutral.

25. The process which comprises reacting upon an o-polyhydroxybenzene containing at least one acid group capable of forming salts with a phenylstibine chloride the benzene nucleus of which is substituted by a substituent selected from the group consisting of the amino, alkylamino, hydroxyalkylamino, acylamino, carbethoxyamino, O—R—COOH (R being an alphatic radical), carbamido, and a substituted amino group which is a member of a heterocyclic nucleus combined with the benzene nucleus, and which benzene nucleus is further substituted by a substituent selected from the group consisting of halogen and alkyl groups, in the presence of a solvent and such a quantity of a base selected from the group consisting of alkali metal bases, calcium bases and magnesium bases, ammonia and aliphatic amines that the final reaction is neutral.

26. The process which comprises reacting upon an o-polyhydroxybenzene selected from the group consisting of pyrogallol disulfonic acid and pyrocatchindisulfonic acid with a phenylstibine chloride the benzene nucleus of which is substituted by a substituent selected from the group consisting of the amino, alkylamino, hydroxyalkylamino, acylamino, carbethoxyamino,

O—R—COOH (R being an aliphatic radical), carbamido, and a substituted amino group which is a member of a heterocyclic nucleus combined with the benzene nucleus, in the presence of a solvent and such a quantity of a base selected from the group consisting of alkali metal bases, calcium bases and magnesium bases, ammonia and aliphatic amines that the final reaction is neutral.

27. The process which comprises reacting upon an o-polyhydroxybenzene selected from the group consisting of pyrogallol disulfonic acid and pyrocatechindisulfonic acid with a phenylstibine chloride the benzene nucleus of which is substituted by a substituent selected from the group consisting of the amino, alkylamino, hydroxyalkylamino, acylamino, carbethoxyamino,

O—R—COOH (R being an aliphatic radical), carbamido, and a substituted amino group which is a member of a heterocyclic nucleus combined with the benzene nucleus, and which benzene nucleus is further substituted by a substituent selected from the group consisting of halogen and alkyl groups, in the presence of a solvent and such a quantity of a base selected from the group consisting of alkali metal bases, calcium bases and magnesium bases, ammonia and aliphatic amines that the final reaction is neutral.

28. The process which comprises reacting upon a pyrocatechindisulfonic acid compound with a phenylstibine compound selected from the group consisting of the oxide and hydrated oxide the benzene nucleus of which is substituted by a substituent selected from the group consisting of the amino, alkylamino, hydroxyalkylamino, acylamino, carbethoxyamino, O—R—COOH (R being an aliphatic radical), carbamido, and a substituted amino group which is a member of a heterocyclic nucleus combined with the benzene nucleus, in the presence of a solvent and such a quantity of a base selected from the group consisting of alkali metal bases, calcium bases and magnesium bases, ammonia and aliphatic amines that the final reaction is neutral.

29. The process which comprises reacting upon a pyrocatechindisulfonic acid compound with a phenylstibine compound selected from the group consisting of the oxide and hydrated oxide the benzene nucleus of which is substituted by a substituent selected from the group consisting of the amino, alkylamino, hydroxyalkylamino, acylamino, carbethoxyamino, O—R—COOH (R being an aliphatic radical), carbamido, and a substituted amino group which is a member of a heterocyclic nucleus combined with the benzene nucleus, and which benzene nucleus is further substituted by a substituent selected from the group consisting of halogen and alkyl groups, in the presence of a solvent and such a quantity of a base selected from the group consisting of alkali metal bases, calcium bases and magnesium bases, ammonia and aliphatic amines that the final reaction is neutral.

30. The process which comprises reacting upon a pyrocatechindisulfonic acid with a phenylstibine chloride the benzene nucleus of which is substituted by a substituent selected from the group consisting of the amino, alkylamino, hydroxyalkylamino, acylamino, carbethoxyamino,

O—R—COOH (R being an aliphatic radical), carbamido, and a substituted amino group which is a member of a heterocyclic nucleus combined with the benzene nucleus, in the presence of a solvent and such a quantity of a base selected from the group consisting of alkali metal bases, calcium bases and magnesium bases, ammonia and aliphatic amines that the final reaction is neutral.

31. The process which comprises reacting upon a pyrocatechindisulfonic acid with a phenylstibine chloride the benzene nucleus of which is substituted by a substituent selected from the group consisting of the amino, alkylamino, hydroxyalkylamino, acylamino, carbethoxyamino,

O—R—COOH (R being an aliphatic radical), carbamido, and a substituted amino group which is a member of a heterocyclic nucleus combined with the benzene nucleus, and which benzene nucleus is further substituted by a substituent selected from the group consisting of halogen and alkyl groups, in the presence of a solvent and such a quantity of a base selected from the group consisting of alkali metal bases, calcium bases and magnesium bases, ammonia and aliphatic amines that the final reaction is neutral.

HANS SCHMIDT.